…

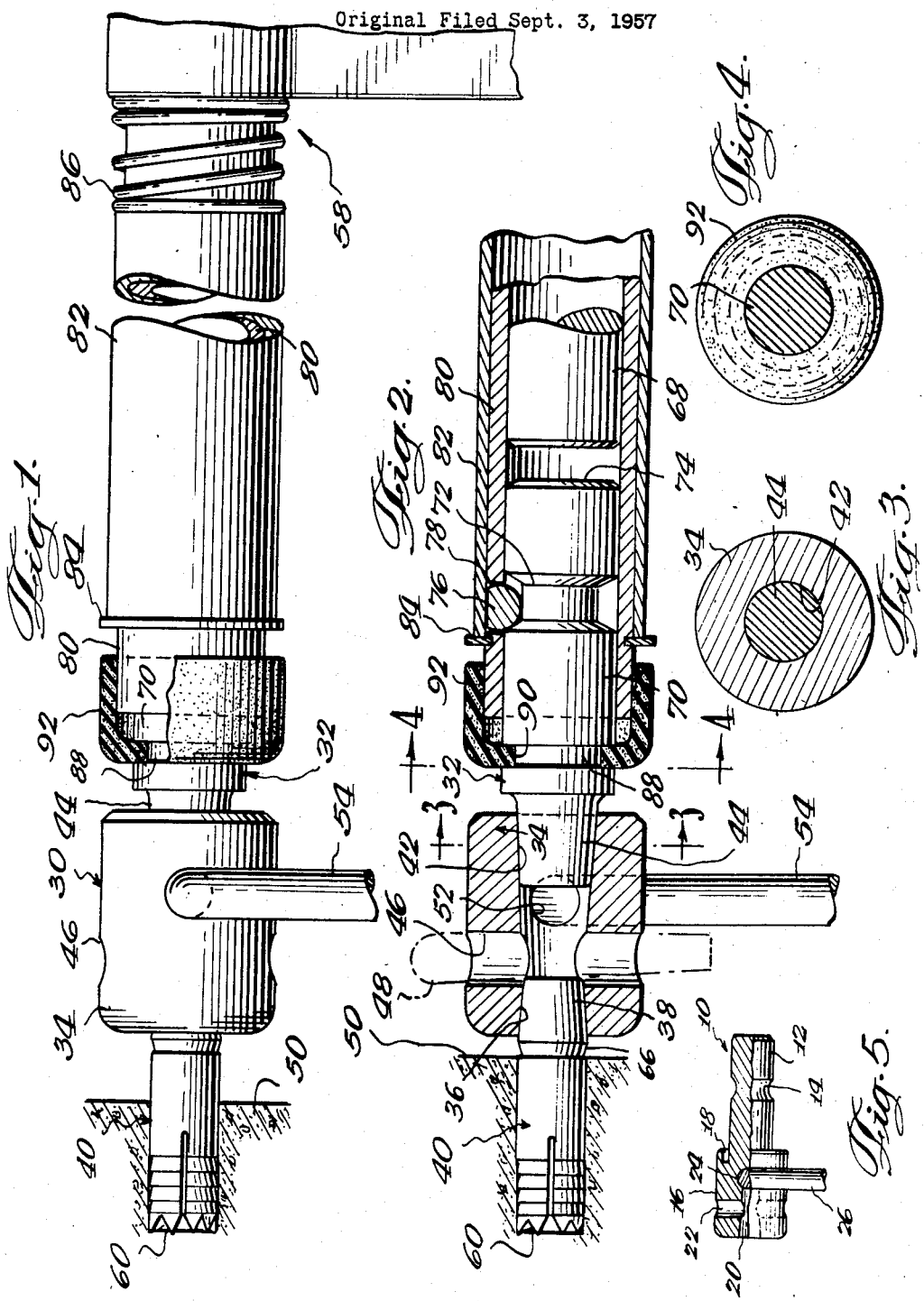

United States Patent Office 2,944,523
Patented July 12, 1960

---

2,944,523

DUST PROTECTOR CAP FOR PERCUSSIVE HAMMERS

Frank A. Werstein, Long Beach, Ind.

Original application Sept. 3, 1957, Ser. No. 681,689, now Patent No. 2,918,290, dated Dec. 22, 1959. Divided and this application Apr. 2, 1958, Ser. No. 725,839

2 Claims. (Cl. 121—32)

This invention relates generally to percussive hammers and more particularly, relates to a novel protective cap for preventing fine particles and dust from entering the tubular end of the hammer during operation of the hammer.

This is a division of application Serial No. 681,689 filed September 3, 1957, now Patent No. 2,918,290, for the invention entitled Chuck and Adapter for Self-Drilling Expansion Shells.

In the application of which this is a division, the invention related to a novel holder for a so-called self-drilling expansion shell. Such a shell comprises a hollow cylindrical member having sharp axially directed teeth at one end and having its opposite end tapered to enable the member to be mounted in a socket provided in a chuck. Shells of this construction are shown and described in U.S. Patents 1,996,121, 1,746,050 and 1,621,598. The shell is installed in masonry, concrete or stone by percussion. The chuck is mounted on the operative or tubular end of a pneumatic, electric or mechanical hammer, the shell inserted in the chuck and the shell is driven against the masonry while the hammer delivers its blows. The shell teeth drill a hole in the masonry and the debris and cuttings pass through the hollow center of the shell and out of a passageway provided in the chuck. Thus, the anchoring of such expansion shells in concrete, masonry and stone always is accompanied by ejection of particles and dust from the shell.

There are a great many constructions for percussive hammers and a great many constructions for chucks for mounting on the operative end of the hammer. In my parent application, there was provided a combined structure of a tool holder and adapter which was referred to as a chuck and adapter when mentioned together in said application and as a tool holder and adapter when referred to separately. Also, there was described and illustrated a chuck of heretofore known construction for use with such self-drilling expansion shells, such chuck having a shank or stem which is inserted into the percussive hammer with which the same is to be used. In the case of either the prior art chucks or the combined structure of the tool holder and adapter disclosed in said parent application, the efflux of particles and dust from the shell during the anchoring operation could enter through the operative end of the percussive hammer to clog and jam the same or harm working components thereof by abrasion. It is therefore a principal object of this invention to provide a novel protective cap for use with percussive hammers to prevent such particles and dust from entering the operative end of the hammer during the drilling process.

An important object of the invention is to provide a dust protector cap of the character described which is capable of substantially universal use in connection with percussive hammers for anchoring self-drilling expansion shells in concrete or masonry, regardless of the chuck mounted to the tubular end of the hammer.

A further object of the invention is to provide a combined structure of a chuck for anchoring self-drilling expansion shells and a protective cap associated with said chuck which will prevent entry of dust and particles into the operative end of the percussive hammer to which the chuck is mounted.

Another object of the invention is to provide a protective cap of the character described which is formed of a resilient material having an opening at one end of an internal diameter enabling the cap to be engaged on the hammer surrounding the operative end thereof and a passageway or aperture through the opposite end through which the chuck may protrude for mounting a tool thereto.

Many additional objects and advantages accrue from the invention as those skilled in the art will appreciate as the invention is more fully described hereinafter. In connection with such description the details of a preferred form has been set forth as required by the patent law in order especially to point out wherein a substantial advance has been made in the arts and sciences. In the drawings:

Fig. 1 is a side elevational view of a chuck and adapter constructed in accordance with the invention of the parent application and having a self-drilling expansion shell, portions of which are in section, seized therein and the dust protector cap embodying this invention installed on a percussive hammer.

Fig. 2 is a similar view, but illustrating the same in section, and in this view the shell has been fully driven into the masonry. In this view as well as the previous view, only a fragmentary portion of the hammer is shown.

Figs. 3 and 4 are transverse sectional views taken along the lines 3—3 respectively of Fig. 2 and in the indicated direction.

Fig. 5 is an elevational view, partially in section, to show a chuck of previous construction, comprising, prior art.

It is considered that the dust protector cap embodying this invention can be employed either with the combined structure of the tool holder and adapter described and claimed in the parent application, or with known chuck structures, such as illustrated in Fig. 5.

Referring to Fig. 5, the reference character 10 identifies a chuck of heretofore known design, said chuck having a shank or stem 12 which is inserted into the percussive hammer with which the same is to be used. The particular structure which includes the annular groove 14 is especially intended for use with the electric hammer illustrated in U.S. Patent 1,968,055 and U.S. Patent 2,767,988.

The shank 12 is integral with an enlarged diameter head 16 the end of which has an undercut groove 18 which is intended to telescope over the end of the hammer to prevent the admission of dust into the hammer. The head has an axial tapered socket 20 opposite shank 12 to receive the self-drilling shell, and the socket communicates with a transverse passageway 22 which is for the purpose of permitting debris and cuttings drilled out of the hole formed by the shell to be worked out, and for the additional purpose of admitting a shell ejector tool. Spaced axially rearward of the passageway 22 is another transverse passageway 24 preferably at right angles to passageway 22 into which is journalled the oppositely facing ends of a looped rod forming a handle or bail 26 used to oscillate or swing the chuck 10 as the drilling operation proceeds.

The chuck 10 is a typical structure, and of moment to this invention is the enlarged diameter of head 16 which is provided with an undercut groove 18. As explained in my parent application, the head 16 was the thickest part of the chuck, and in the fabrication thereof, considable waste of material cut away during forming of the chuck was a disadvantage. Where such chuck is formed with head diameters substantially reduced, the undercut groove 18 must of necessity be eliminated. This invention eliminates any need for such groove 18 to prevent admission of dust to the hammer and thereby further encourages such reduction in the diameter of a head on the chuck, such as head 16.

Figs. 1 and 2 illustrate the combined structure of the tool holder and adapter of the parent application and with which the dust protector cap of this invention may be utilized. Instead of an integral chuck 10, there are formed two parts, namely, a tool holder 30 and an adapter 32. The tool holder comprises a cylindrical member 34 having one end, the left in the figures, provided with an axial socket 36 of such dimensions to receive the tapered end 38 of a self-drilling shell 40 of a predetermined size. The right hand end of the cylindrical member has another socket 42 of tapered formation, so dimensioned to receive the male tapered end 44 of the adapter 32.

The tool holder also is provided with a tapered passageway 46 which passes completely through the cylindrical member 34 and may receive the ejector tool shown in fragmentary outline 48 in Fig. 2. Since the self-drilling shell is hollow, as it is hammered and drilled into masonry 50, the stone dust and debris particles will work through the center of the shell and out of the rear thereof through passageway 46. The cylindrical member 34 has another passageway 52 preferably normal to passageway 48 in the open ends of which is journalled the inwardly facing ends 56 of a bail or handle 54. The handle 54 may swing about the axis defined by ends 56, and is used to steady, support and oscillate the percussive hammer 58 during the drilling process.

Illustrated shell 40 has hardened teeth 60 on its forward end and fracture grooves 62 adjacent said end for well known purposes. The shell 40 is intended to be driven into masonry 50 and have its tapered end 38 broken off by lateral strain. The annular fracture groove 66 provides a weakened area at which the fracture occurs.

The hammer identified by reference character 58 includes a structure for mounting the adapter 32 or the chuck 10 of Fig. 5 which is described in considerable detail and claimed in U.S. Patent 2,767,988, which is owned by the assignee of this application. There is a reciprocating plunger 68 which imparts blows to the impact end of the shank 70 of adapter 32 or where the chuck 10 is used, to the impact end of the stem 12. The shank 70 has an annular groove 72 spaced from the impact end 74, the axial length of which controls the stroke of the hammer, being confined to its reciprocating movement by the key 76. The key 76 is confined in slot 78 formed in the tube 80 of the hammer and locked in place by telescopically slidable sleeve 82 which covers the same and is pressed against the stop ring 84 by the spring 86. It may be noted that chuck 10 has groove 14 which would likewise be so engaged by the key 76 if chuck 10 were being mounted to the operative end of hammer 58.

The dust protector cap embodying the invention is designated 92 in Figs. 1 and 2. The member 92 is formed of some soft resilient material, such as rubber or the like, as a cup-shaped member which opens at one end thereof toward the hammer 58, with its internal diameter being such that it can be engaged upon the free end of the tube 80 of the hammer. Adjacent the forward end of shank 70 there is provided an annular groove 88 and said groove seats the annular lip 90 provided by an aperture in the opposite end of the cup-shaped member 92. It may be noted that the diameter of said aperture is less than that of the opposite open end of the cup member. Said member 92 therefore provides a resilient and substantially dust tight connection so that dust, debris and particles of masonry, cement or stone in which the shell 40 is embedded cannot enter the tube 80 and cause damage to the parts of the hammer 58 by abrasion. The dust cap 92 may be provided as part of the adapter 32, or as part of a chuck such as identified by the numeral 10 which has been provided with a groove, such as annular groove 88 for seating the lip 90.

It is believed that no further explanation is necessary, but it is emphasized that variations in the size, proportions and minor details of said dust protector cap may be made without departing from the spirit or scope of the invention as defined in the appended claims.

What it is desired to secure by Letters Patent of the United States is:

1. In a device of the character described and including a percussive hammer having a tool-holding sleeve protruding from the hammer, a tool operatively engaged on the interior of the sleeve and readily removable therefrom, a cylindrical member of resilient material having an open end thereof removably disposed on the exterior surface of the sleeve in substantially dust-tight engagement therewith, a readily separable lip and groove connection between the cylindrical member and the tool to enable the cylindrical member to reciprocate with the tool and simultaneously along the exterior surface of the tool-holding sleeve during operation and be carried by the tool when the tool is removed from the tool-holding sleeve the cylindrical member sliding off said sleeve in the latter instance.

2. In a device of the character described and including a percussive hammer having a tool holding sleeve protruding from said hammer, a tool operatively engaged on the interior of the sleeve and readily removable therefrom, a dust-protector cap comprising a cylindrical member of resilient material having an open end tightly engageable with the exterior surface of said sleeve in substantially dust tight relationship, said member having a peripheral lip portion at its other end engageable with said tool, said member being adapted for reciprocal movement with said tool, the upper portion of said member adapted for simultaneous reciprocal movement along the exterior surface of said sleeve.

References Cited in the file of this patent
UNITED STATES PATENTS

| | | |
|---|---|---|
| 777,681 | Lindstrom | Dec. 20, 1904 |
| 917,575 | Fischer | Apr. 6, 1909 |
| 1,408,691 | Clark | Mar. 7, 1922 |
| 2,088,670 | Smith | Aug. 3, 1937 |
| 2,154,651 | Wodack et al. | Apr. 18, 1939 |
| 2,685,874 | Ford | Aug. 10, 1954 |
| 2,834,577 | Feucht | May 13, 1958 |

FOREIGN PATENTS

| | | |
|---|---|---|
| 457,166 | Germany | Mar. 9, 1928 |